United States Patent
Aliakseyeu et al.

(10) Patent No.: US 11,023,952 B2
(45) Date of Patent: Jun. 1, 2021

(54) METHOD OF USING A CONNECTED LIGHTING SYSTEM

(71) Applicant: SIGNIFY HOLDING B.V., Eindhoven (NL)

(72) Inventors: Dzmitry Viktorovich Aliakseyeu, Eindhoven (NL); Jonathan David Mason, Waalre (NL); Berent Willem Meerbeek, Veldhoven (NL); Sanae Chraibi, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/616,643

(22) PCT Filed: May 22, 2018

(86) PCT No.: PCT/EP2018/063375
§ 371 (c)(1),
(2) Date: Nov. 25, 2019

(87) PCT Pub. No.: WO2018/215459
PCT Pub. Date: Nov. 29, 2018

(65) Prior Publication Data
US 2020/0167846 A1 May 28, 2020

(30) Foreign Application Priority Data

May 24, 2017 (EP) ..................... 17172742

(51) Int. Cl.
*H04W 4/23* (2018.01)
*H04W 4/30* (2018.01)
(Continued)

(52) U.S. Cl.
CPC .......... *G06Q 30/0631* (2013.01); *G06N 5/04* (2013.01); *H04W 4/021* (2013.01); *H04W 4/23* (2018.02); *H04W 4/30* (2018.02)

(58) Field of Classification Search
CPC ... H04W 4/00–027; H04W 4/23; H04W 4/30; H04W 4/33; H04W 4/35; H04W 4/38; G06Q 30/0631; G06N 5/04
See application file for complete search history.

(56) References Cited

U.S. PATENT DOCUMENTS

2008/0147337 A1* 6/2008 Walters ................. G06Q 30/04
702/64
2008/0218334 A1* 9/2008 Pitchers .............. H04L 41/0893
340/539.1
(Continued)

*Primary Examiner* — San Htun
(74) *Attorney, Agent, or Firm* — Meenakshy Chakravorty

(57) ABSTRACT

According to one aspect disclosed herein, there is provided a method of using a lighting system comprising multiple luminaires, the method comprising: gathering information relating to a placement of a plurality of the luminaires within the environment; based on the gathered information, deducing one or more spatial characteristics of the environment, the spatial characteristics comprising information on one or more zones of the environment; and storing an environment profile for the environment in a storage location accessible by a recommendation engine, the environment profile comprising at least the spatial characteristics of the one or more zones, thereby causing the recommendation engine to filter a set of items based on the spatial characteristics and thereby recommend a subset of the items resulting from the filtering.

12 Claims, 2 Drawing Sheets

(51) Int. Cl.
*G06Q 30/06* (2012.01)
*G06N 5/04* (2006.01)
*H04W 4/021* (2018.01)

(56) References Cited

U.S. PATENT DOCUMENTS

| | | | |
|---|---|---|---|
| 2011/0031897 A1* | 2/2011 | Henig | H05B 47/18 |
| | | | 315/297 |
| 2014/0022917 A1* | 1/2014 | Apte | H04L 12/2803 |
| | | | 370/252 |
| 2014/0167620 A1* | 6/2014 | Chobot | H05B 47/18 |
| | | | 315/153 |
| 2015/0019342 A1 | 1/2015 | Gupta | |
| 2015/0038165 A1* | 2/2015 | Tuo | H05B 47/19 |
| | | | 455/456.1 |
| 2016/0035011 A1 | 2/2016 | Tuo et al. | |
| 2016/0260135 A1 | 9/2016 | Zomet et al. | |
| 2017/0035645 A1 | 2/2017 | Lydecker et al. | |
| 2018/0248760 A1* | 8/2018 | Deixler | H05B 45/37 |

* cited by examiner

METHOD OF USING A CONNECTED LIGHTING SYSTEM

CROSS-REFERENCE TO PRIOR APPLICATIONS

This application is the U.S. National Phase application under 35 U.S.C. § 371 of International Application No. PCT/EP2018/063375, filed on May 22, 2018, which claims the benefit of European Patent Application No. 17172742.3, filed on May 24, 2017. These applications are hereby incorporated by reference herein.

TECHNICAL FIELD

The present disclosure relates to a method of exploiting the data available in a connected lighting system.

BACKGROUND

A burgeoning market currently increasing in scope is that being built around smart devices and home networks. Systems being formed from such elements typically fall under the heading of smart home systems. Smart home systems are often connected to the Internet, typically such that they may be controlled by a user when (s)he is out-of-home. Although referred to above as a 'home' system, such a system can be implemented in any environment such as a work space or outdoor space, such that the system comprises, and may be used to control, devices placed within the environment. The connected devices are any devices capable of being connected to, or identified by, the system. A commonly used phrase for such a system and its devices is the Internet of Things (IoT) and IoT devices. In the Internet of Things (IoT) many kinds of devices are connected to the Internet, allowing elements of an environment such as heating and lighting to be controlled using dedicated devices which are networked together into the 'home' system. Thus such devices are controllable by an inhabitant of the environment or user of the system.

In particular reference to the above mentioned lighting of the environment, a connected lighting system may be implemented as part of the smart 'home' system. Connected lighting systems are a class of lighting systems comprising networked illumination sources, preferably connected via a wireless network so that the illumination sources are wirelessly controllable. These illumination sources can be controlled from various user interfaces, such as smartphone and tablet applications, via internet services, or via connected physical devices such as sensors and switches. The behaviour that can be assigned to a connected lighting system offers more opportunities than traditional lighting systems. For an end-user it is possible to specify how he wants his lighting system to behave. It is even possible to specify different forms of behaviour at different moments in time. In other words the user is now able to use his or her lighting system not only for illumination or atmosphere creation but as a way to support or enhance any other activities happing in the home environment or online, e.g. for entertainment, security, notifications, etc.

US 2015/038165 A1 discloses systems and methods for indoor navigation control by LED lighting devices comprising: at least two LED lighting devices each including a Wi-Fi module forming a wireless local area network for data transmission; a location server configured to store location information of the Wi-Fi module with a unique MAC address; a smart terminal to calculate a position, a moving direction, and a moving speed of an object according to the location information of each LED lighting device along with a moving time length of the object for an indoor navigation.

SUMMARY

A consequence of maintaining such a smart home system or environment management system is that information can be collected about the environment it is incorporated into. Such information may have had an initial purpose within the system that caused it to be included or entered, but this gathered information may further be used to inform other secondary processes or actions such as modifications to the same environment. The inventors have realized that such a secondary purpose may be the recommendation of items to a user with which the environment may be modified. For example a user of the system may be presented with an option to modify the environment by incorporating a new item of furniture such as a different sofa or table. Such recommendations may be informed using information previously gathered by the environment management system. In particular the inventors have realized that a significant amount of information about the layout of an environment can be deduced from the connected lighting system already implemented as part of the environment management system. This gathered information can then be entered into an environment or user profile and used by a recommendation engine to filter a set of items such that a subset of items can be recommended based on the characteristics of the environment profile.

The present invention serves to use information gathered from a connected lighting system to deduce features of the layout of an environment and in turn inform a recommendation engine such that a subset of potentially suitable items or objects for modifying said environment can be recommended.

Hence, according to a first aspect disclosed herein, there is provided a method of using a lighting system comprising multiple luminaires, the method comprising: gathering information relating to a placement of a plurality of said luminaires within said environment; based on the gathered information, deducing one or more spatial characteristics of the environment, the spatial characteristics comprising information on one or more zones of said environment; and storing an environment profile for said environment in a storage location accessible by a recommendation engine, the environment profile comprising at least said spatial characteristics of the one or more zones, thereby causing the recommendation engine to filter a set of items based on the spatial characteristics and thereby recommend a subset of the items resulting from the filtering.

The item(s) of the set or subset may be physical objects to be placed within the environment e.g. items of furniture such as a sofa or table. Alternatively or the item(s) may be digital items, e.g. audio or video media such as a particular movie or song to be played out into the environment, or light scene to be rendered by some or all of the luminaires in the environment. These digital items may be recommended based on characteristics that include positions, types, or configuration of lights that may suit the usage requirements of the digital item.

In embodiments, said gathered information comprises information about an identity of a group to which each of the plurality of luminaires belongs and a number of luminaires in each group, and said deducing comprises deducing the existence of the zones based on the groups.

In embodiments, said gathered information comprises information about a position of each of said plurality of luminaires within the environment.

For example the position may comprise the position of a luminaire relative to another luminaire, or as a co-ordinate within a layout of the environment. The relative position being determinable based on such methods as time of flight, signal strength, and angle of arrival of signals emitted and received by respective luminaires of the environment.

In embodiments, said deduced spatial characteristics comprise one or more dimensions of at least one of the zones, deduced based on the positions of two or more of the plurality of luminaires.

In embodiments, said gathered information comprises distance measurements between two or more of the luminaires within said at least one of the zones of the environment. For example information relating to the position or placement of two or more of the plurality of luminaires can be determined by triangulation, trilateration, multilateration, or fingerprinting.

In embodiments, said deduced spatial characteristics comprise an indication of the number of zones.

In embodiments, said deduced spatial characteristics comprise an indication of a size of at least one of the zones.

In embodiments, said deducing of the size is based on the number of luminaires within a corresponding one of said groups.

In embodiments, the method further comprises deducing a type of one or more of the zones based on the identity of a corresponding one or more of the groups.

In embodiments, the type of zone is selected from amongst a list comprising: bathroom, living room, dining room, kitchen, nursery, games room, hallway, basement, garage, utility room, attic, garden.

In embodiments, the type of zone is deduced from the identity of the group to which each of the plurality of luminaires belongs.

In embodiments, the identity comprises a user specified name allocated by a user to at least one luminaire within each of said groups.

In embodiments, the gathered information further comprises a model number, a model name, and/or a unit code of at least one luminaire within each of said one or more zones of the environment such that the type of zone is deduced based on associated specification information for said luminaire.

In embodiments, the recommendation engine is a third party recommendation engine operated by a different party than performs said method.

In embodiments, the recommended modification comprises an addition of an object to said zone of the environment.

In embodiments, the object comprises an item of furniture, and/or a kitchen appliance, and/or a piece of artwork.

In embodiments, the third party recommendation engine is part of an online purchasing platform and/or an online advertisement provider.

According to a second aspect disclosed herein, there is provided a computer program product comprising code embodied on computer-readable storage and configured so as when run on one or more processing units of a computing device to perform operations in accordance with any of the methods disclosed herein.

According to a third aspect disclosed herein, there is provided equipment comprising memory comprising one or more memory units and processing apparatus comprising one or more processing units, the memory storing code arranged to be run on the processing apparatus, and the code being configured so as when run on the processing apparatus to perform operations in accordance with any of the methods disclosed herein.

According to a fourth aspect disclosed herein, there is provided a system comprising said equipment and lighting system.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
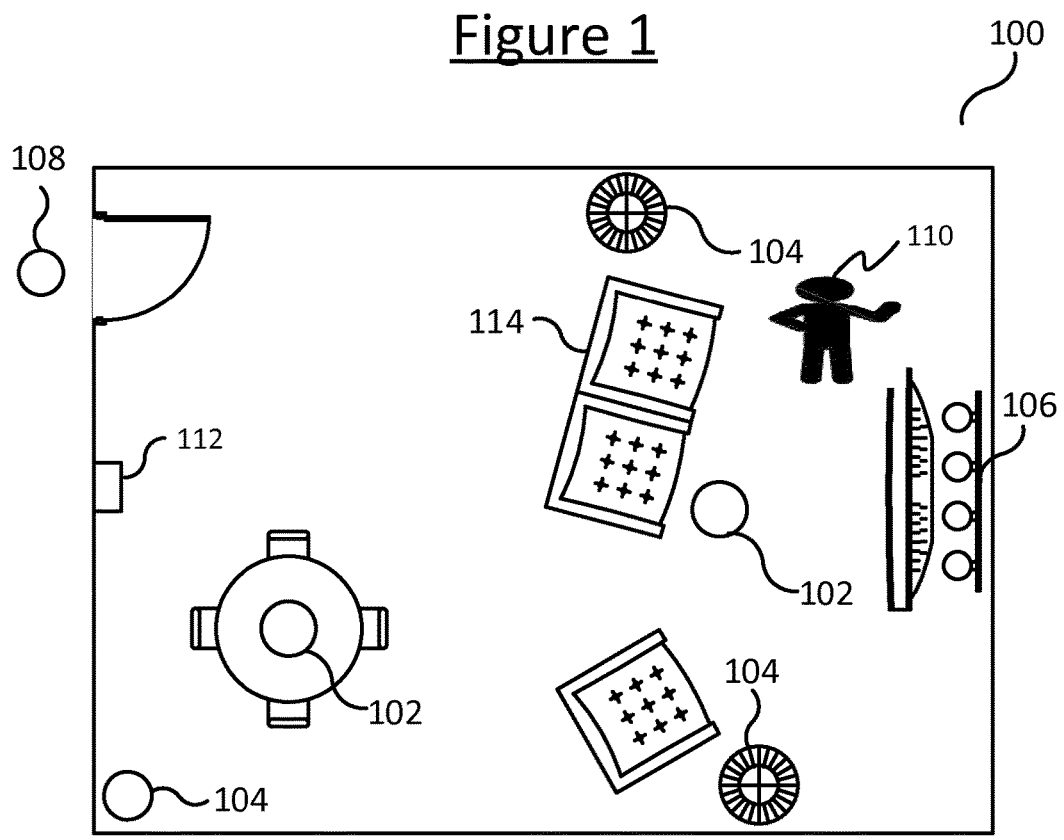
FIG. 1 shows an example environment containing a connected lighting system.

The home is a highly unique place. Homes vary in size, the types of room people have, interior designs and styles, and how they use those rooms. The products and appliances people purchase for their home is thus influenced and maybe even restricted by the physical home and the use of the space. There is currently a poor link between the information a smart home system may have and the use of this information to inform online activities, for example shopping platforms. The present invention describes a method for the application of smart home data in order to gather further information about an environment. This information can then be used to assist modifications to said environment, for example improving recommendations made to users online, i.e. using online shopping purchasing profiles. Using data typically collected by a smart home device such as lighting layouts and other statistics and attributes of a connected lighting system, a recommendation engine may deduce or be directly provided with information about the environment of the connected lighting system such as a type of room or other zone, or a zone or room use, activity, decorative style, and so forth. Further uses of this lighting system derived information can be for example to provide information to online purchasing platforms to enhance the user's profile and thereby enhance the shopping experience. Herein the term zone may indicate an area within a larger space, e.g. a kitchen zone or bedroom zone within a studio flat, or a specifically defined and enclosed room such as a bathroom. Spaces such as gardens and patios which also form parts of an environment may also be referred to as zones, and examples given with reference to rooms should not interpreted as excluding such outdoor zones.

Environment management systems and connected lighting systems are becoming ever more popular to a wider population. This is encouraged by technological developments enabling easy adoption and integration of these systems in our homes, offices, and other environments, e.g. products embedded with voice recognition agents. Such technological products combine smart home control functions with the purchasing power of web shops. This in turn opens up new opportunities for the use of smart home data and communicating and using that information.

The smart home however is not yet that smart. Currently, much of the data is collected in silos such as that from the heating or lighting system, but this data is not shared or well applied across other functions of the smart home or necessarily stored in a form usable by other smart home devices. With the rise of Internet connected smart home hubs and cloud computing services, the practicalities and opportunity for the sharing of such data can be realised.

The present invention uses data gathered from a connected lighting system of an environment to deduce information about the environment itself. This deduced information can then be used to recommend ways to modify the configuration and contents of the environment. For example such information could improve an online shopping experience by using data available to a smart home system that may otherwise have remained segregated or associated only very explicitly within the system. More specifically, this deduced data can be generated by the smart home system and related to characteristics of the environment, e.g. size of the environment or specific zones or rooms thereof; number of rooms; number of users; presence patterns of users etc. These characteristics are made available by the smart home system for its own wider use, or for outputting for other purposes, in the form of an environment profile. I.e. the profile can be accessible to a recommendation engine or online service which for example facilitates an online shopping experience. The recommendation engine can use the characteristics found in the environment profile to filter items in a set (e.g. the items available for sale on a website), in order to produce a subset of these items (e.g. only the items for sale on the website which will fit in the lounge), the subset being based on the characteristics within the environment profile.

In one particular example, as smart home devices become linked with large platform shopping providers there is provided an opportunity that data gathered and deducible by the smart 'home' system can be used to inform purchasing profiles of the smart home system user. Further to this, purchasing profiles containing information on recent purchases of the same user may be used to inform or update smart home functioning.

Using data typically collected by a smart home device, such as room type, room use, activity, style, and so forth, this information can be applied to further user actions such as to inform online purchasing platforms to enhance the user's profile. The inventors have realized that much of this information can be derived from the connected lighting system of an environment and provided to an environment management system such as a smart home system for more general use and outputting. As such characteristics of an environment can be used by a recommendation engine to filter a set of items and provide a suitable subset of items. In particular, it is recognized herein that spatial characteristics of a space can be inferred from a connected lighting system, an these in turn can be used to filter a set of items (e.g. different sized items of furniture) to select those most suitable for the space Further examples of characteristics that can be inferred from a connected lighting system include a style of the room, usage behaviour or activity levels (e.g. the amount of time a user spends in a given room or other such zone), user behaviour, user context etc.; and these can also be taken into account in the filtering.

There is described herein a number of different ways in which gathered information can be used to deduce characteristics about an environment, and how these characteristics may be used by a recommendation engine to select a subset of items from a larger set of items.

FIG. 1 shows a layout of a typical user environment 100, comprising a connected lighting system which forms part of a smart environment system (here a smart home system). The connected lighting system comprises a number of different types of luminaire 102, 104, 106, 108. Each luminaire comprises: at least one respective lamp (e.g. LED lamp, filament bulb or fluorescent tub); a wired or wireless communication interface for communicating with a controller 112; and any associated socket support, and/or housing. Each of the luminaires may take any of a variety of forms, e.g. a ceiling mounted luminaire, a wall-mounted luminaire, a wall washer, or a free-standing luminaire (and the luminaires need not necessarily all be of the same type).

For example, a first type of luminaires 102 are luminaires providing illumination from above in a space centralised manner. That is to say, these luminaires 102 are luminaires of the type typically found in the centre of the ceiling of a room providing the main illumination for that particular space. A second type of luminaires 104 are luminaires which typically provide side illumination. For example these luminaires are typically table lamps and/or standing lamps positioned at the sides of an environment to provide optional peripheral illumination. A third type of luminaire 106 is a luminaire for providing entertainment illumination. Such a luminaire typically provides illumination to accompany various types of media being played out within the environment. For example in this particular configuration the luminaire 106 comprises four lamps and is positioned behind a display for providing light effects to accompany visual media. A fourth type of luminaire 108 may be an external illumination device. Although positioned outside, the luminaire may still be considered as part of the environment lighting and connected to the connected lighting system. For example in this particular example luminaire 108 is a porch light. Such a luminaire typically provides illumination around and entrance and or exit to building. Further examples of external lighting that may be incorporated into a connected lighting system include security lighting or walkway lighting etc. The connected lighting system may further comprise a controller or bridge 112 connected to control the luminaires.

It should be understood that any number of luminaires described above could be added or removed from such a connected lighting system. Further to those specific examples given above, many other types of luminaires may be incorporated into the lighting system, in reality any luminaire capable of being interfaced in connected way with a network could form part of a connected lighting system as described herein. Luminaires forming the connected lighting system may comprise a single or multiple lamps. These luminaire are all capable of connecting to the connected lighting system through a wireless interface. This interface may form either part of the housing of the luminaire or part of the one or more lamps forming the luminaire.

The lighting control device 112 may be implemented on a dedicated lighting bridge such as the Philips Hue bridge, or on any other suitable apparatus such as a general purpose user terminal (e.g. smartphone, tablet, laptop or desktop), a server, or a dedicated wall-panel, etc. As another example, some or all of the lighting controller 112 could be integrated into, or could be split between any two or more, component devices of the connected lighting system (e.g. an entertainment system, a user input device etc.). Wherever implemented, the lighting controller 112 may be implemented in the form of software stored on a memory of the relevant apparatus and arranged to run on a processor of that apparatus (the memory comprising one or memory devices and the processor comprising one or more processing units). Alternatively it is not excluded that the lighting controller may be implemented in the form of dedicated hardware circuitry, or configurable or reconfigurable hardware circuitry such as a PGA or FPGA, or any combination of hardware and software.

The lighting controller 112 and luminaires 102-108 form a lighting system, in which the lighting controller 112 and the one or more luminaires are networked together into a local lighting network 210. That is, the lighting controller 112 is arranged to connect to each of the luminaires by means of a wired or wireless connection. Preferably the local lighting network 210 is a wireless network, with the lighting controller 112 being arranged to connect to the luminaires by means of a wireless connection using a wireless access technology such as Wi-Fi, ZigBee or Bluetooth, or the like. Furthermore, the lighting controller 112 may be arranged to connect other devices within the environment 100, e.g. an entertainment system, again by a wired or wireless connection, and preferably a wireless connection such as Wi-Fi, ZigBee, Bluetooth or the like. The further devices of the environment may connect to the lighting controller 112 as part of the same lighting network as the luminaires, or by a separate channel, as part of a smart home system. The various interactions described herein between the lighting controller 112 and the luminaires may be conducted via any of the above means or others, and for brevity the means of connection will not be repeated each time.

Figure 2:
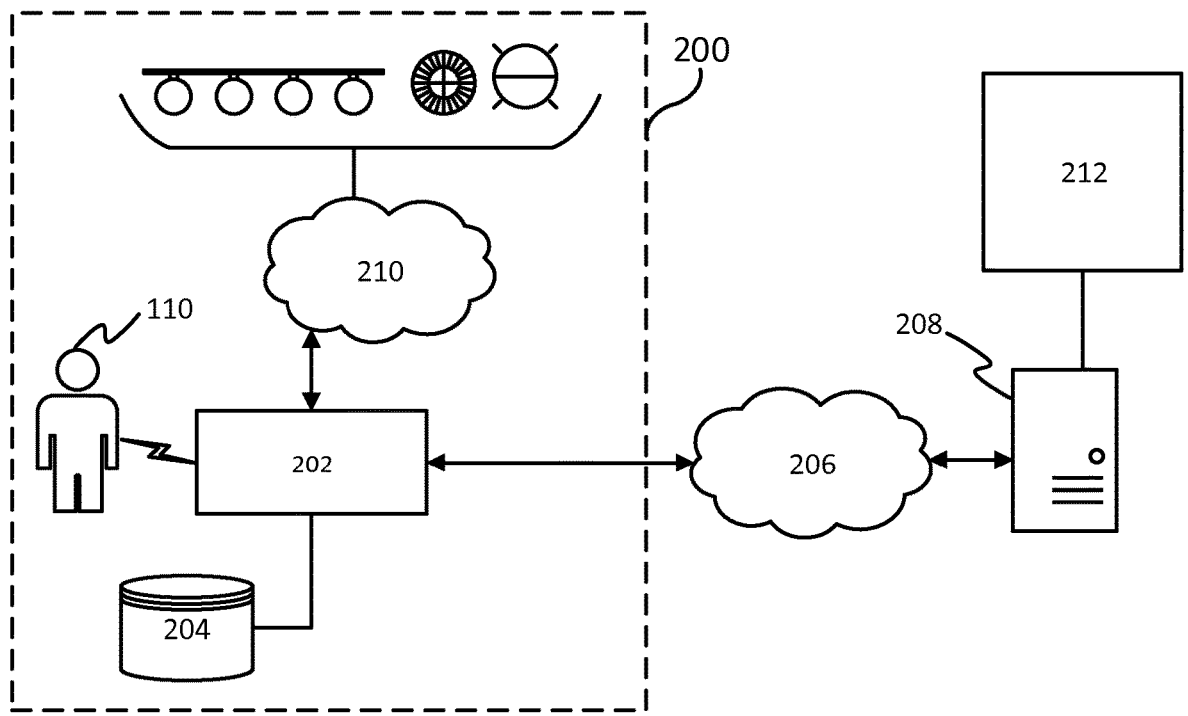
FIG. 2 shows a schematic diagram of an environment management system comprising a connected lighting system and an environment management system application.

FIG. 2 shows a connected lighting system having been incorporated into a smart home system 200. This connected environment management system 200 can be controlled by user 110 through environment management system client application 202. The client application 202 is able to receive user input from user 110 in relation to any of the devices forming the environment network group and carry out commands based thereon. The user input may be received from the user 110 via a dedicated user interface connected directly to the environment management network and/or connected lighting system and forming part of the smart home system itself, or the user interface may form part of a device capable of connecting to a wider network such as the Internet, through which commands can be transmitted to the environment management system and its associated devices.

The environment management application is further connected to a database 204. Database 204 contains any data gathered from the devices forming the environment management system (i.e. the smart home system). This data may be cached separately for each device and used to inform the associated device in carrying out commands. For example the database may store rules and/or timetables which define the processes to be carried out by any number of devices being part of the smart home system. E.g. the database may comprise a timetable for temperature control of the thermostats for particular rooms within a house for particular times of day. The database may also store particular lighting configurations for particular sets or groups of lights within the connected lighting system. As well as storing command related data, the database 204 may also store historical data of the environment management system. This may be used to infer patterns in behaviour of the user for suggesting lighting configurations etc.

In the present invention this gathered data is used to create an environment profile. This environment profile can contain information specific to an environment as derived from the devices of the environment management system. In particular information derived from the connected lighting system.

More specifically, in relation to the connected lighting system, the environment management system may use information such as user given names for the luminaires, grouping of luminaires, room naming and luminaire allocation, pictures of luminaires, rooms, light content, light scene naming, location and/or frequency of use of these scenes, in order to derive environment specific data for use in an environment profile. This environment profile may in turn be associated with a particular user 110.

For example, using dedicated lighting apps it is possible allow a user to define his own rooms (i.e. by naming) or select default room names, such as "Living room". A further example may be selecting a default "kid's bedroom" versus entering a name like "Tim's bedroom". The former case giving more information about the house and family occupying it than the later (as it is not necessarily clear who Tim is). Light content, as mentioned above, may refer either to dynamic light scenes that can be generated in real-time using an algorithm that resides in the lighting app or a bridge (e.g. fireplace light effect), or can refer to light scenes streamed from any kind of lighting cloud service. In both of these cases the result is a dynamically changing light scene, the specific type of light content used can then provide information about user preferences and behavior. For example the same activity every evening where a fire place effect is used might be used to infer relaxation or reading time. In relation to the above mentioned pictures of luminaires, lighting control apps may use pictures of luminaries as a means for the user to more easily identify which luminaire they are controlling. In this case the picture of the luminaire (e.g. a chandelier) may also help to infer additional information about environment and how it is used (e.g. a chandelier implies something about the style of the room, and the fact that it is probably a large room).

The environment management system may also be connected to a wider network 206 such as the Internet. As mentioned briefly above, this may enable user input to be received via any user interface of any device also capable of connecting to the Internet. However, it is also to be appreciated that as part of embodiments, the environment management system's connection to such networks as the Internet also enables the environment profile to be output as a sharable source of information. For example such an environment profile may be usable by online purchasing platforms 212 to create a purchasing profile for a user associated with that particular environment.

It should be understood that many of the functions described above with regards to the environment management system could also be carried out at a remote location on a server 208 of a connected computer network as well as or instead of within the environment management system itself. Gathered information may be stored in any memory comprising any memory device or combination of memory devices at any location or locations, such as the bridge 112, server 208, a user terminal of user 110, a wall-panel user interface of user 110, or the luminaire(s) themselves, etc.

The environment profile can then be used to inform various other processes in order to improve the user experience for the user 110. For example the environment profile information can be used to inform a purchase profile for said user, allowing for improved recommendations to be made. That is to say the information previously confined to the connected lighting system of the environment of user 110 can be incorporated into an environment profile that may be used to recommend e.g. furniture in keeping with the size and style of the home of user 110. In this way information already known to one part of the smart home system can be extrapolated into a form usable in other parts.

Figure 3:
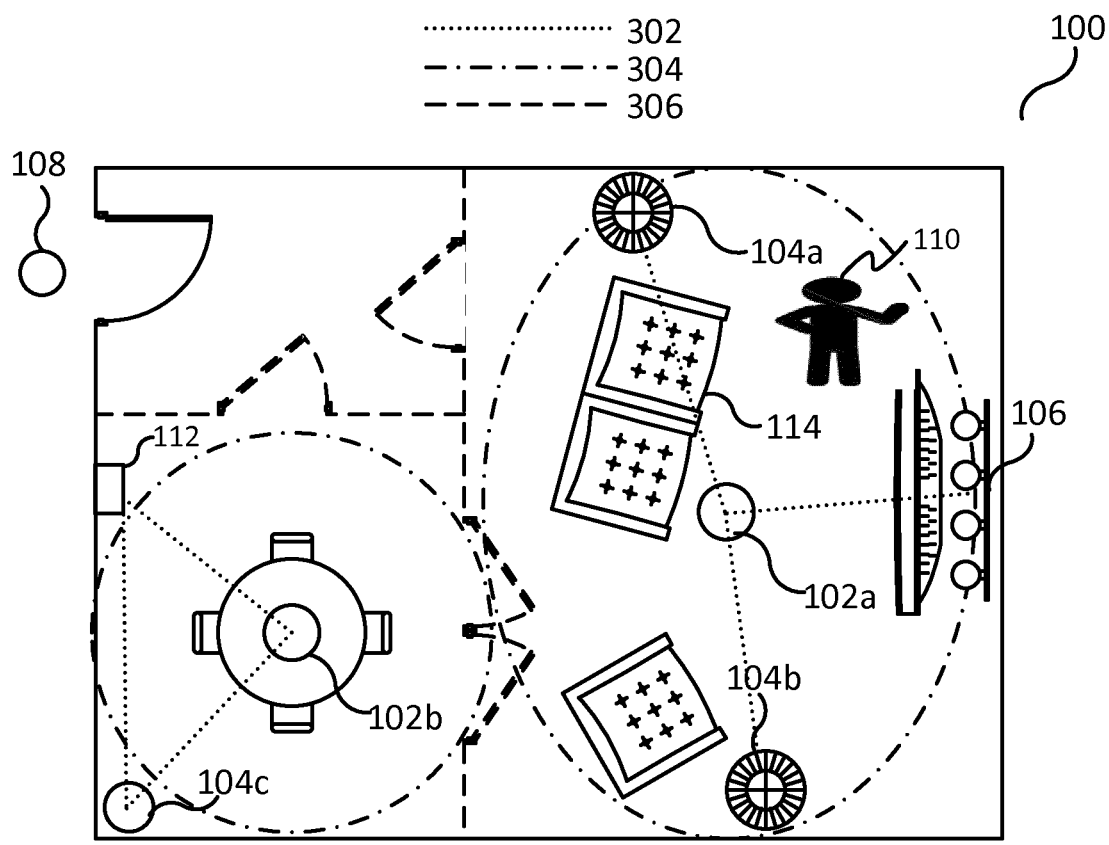
FIG. 3 shows a deduced layout of the same example environment of FIG. 1 based on data made available and obtained from the connected lighting system.

FIG. 3 shows a floorplan of environment 100 similar to that shown in FIG. 1. The same luminaires of the connected lighting system described with respect to FIG. 1 are also shown.

The user 110, when setting up e.g. a smart home device, will often inform the environment management system of the rooms that may be in the home as a corollary of the set up process. I.e. by the naming of a luminaire, or the naming of the different spaces, such as via the room classification in the Philips Hue app. Similar information on the types of spaces within a home can also be gathered from environment management system sub-divisions such as heating, and/or blinds and curtains. These systems are often labelled by the user prior to setting up specific rules, themes, or schedules for these system devices. The usage of the systems like the lighting, blinds/curtains or heating in these rooms will also provide additional information such as the frequency and timing of a room's use or profiles of when the user comes and goes.

It is also possible to determine layout information for an environment based on connected lighting system information. For example, as well as definitions of types of zones, such as bathroom, living room, dining room, kitchen, nursery, games room, hallway, basement, garage, utility room, attic, garden, etc. it may also be possible to estimate a size of a zone. Often illumination is arranged to fit the area in which it exists. This means that a larger room would typically be expected to contain a greater number of luminaires. The user of the connected lighting system will also typically group luminaires in relation to the zone being illuminated. For example luminaires 104a, 104b, 102a and 106 may all be part of the group 'living room'. This may be because they are included explicitly in a group as defined within the connected lighting system, or it may be deduced from the names given to the luminaires by the user 110. For example luminaire 104a may be named 'living room sofa side lamp', 'living room side lamp', or simply 'sofa side lamp', or 'side lamp' and assigned to the luminaire group 'living room'. Luminaire 106 may be similarly labelled as 'living room entertainment', 'living room television lighting', or simply as 'entertainment', entertainment lighting', or 'television lighting' and assigned to the group 'living room'. The luminaire group 'living room' may thus be explicitly defined or deduced to include four luminaires. This information may be used to in turn deduce a rough estimate of the size of the living room environment. The room size may be deduced approximately based on the number of luminaires present in the room. I.e. there are three luminaires in the 'dining room', three luminaires in the 'kitchen' and eight luminaires in the 'lounge'. Based on this information it may be deduced that the lounge is much bigger than the kitchen and the dining room. It may also be deduced, based on this same information, that the kitchen and the dining room are of a similar size.

Alternatively or additionally, the number of zones may be used to deduce the size of the environment 100 as a whole. For instance if there are groups of luminaires with a large number of different room names, implying a large number of rooms, it may be deduced that the environment 100 is a large house; but conversely if there are a small number of differently-labelled groups, this may be used to infer a small environment such as a studio flat.

In further alternative or additional embodiments luminaires may be capable of directly sensing the proximity of neighbouring luminaires. As result distance information can be added to the layout information for a room such as the living room within the environment profile. For example it may be determined that the largest dimension of the living room is the determined distance from luminaire 104a to luminaire 104b, and as such the environment 'living room' has at least one dimension of at least this size. In embodiments such proximity or position information may be determined, e.g. using triangulation, trilateration, multilateration, or fingerprinting, or retrievable from a location database. The location database may comprise information on the locations of all luminaires within the rooms or zones of the environment. The position information may be given as distances relative from one luminaire to another luminaire, or as co-ordinate information recording the position of a luminaire within a gridded layout mapping all luminaires of the environment. This information thus forms part of the gathered information already available to the connected lighting system.

In embodiments the luminaires or connected lighting system as a whole may be able to triangulate positions of luminaires relative to other luminaires and provide more accurate dimension measurements for the environment, e.g. 'dining room'. This process may also include the controller 112 of the connected lighting system as shown in FIG. 3.

The deducing of dimensions of the environments of luminaires in a connected lighting system may also include making certain assumptions. For example it may be possible to assume that luminaires 102a and 102b, which may be identified (e.g. by a name and/or a model number etc.) as the main lighting of their respective groups, are in the centre of their respective environments. As such it may be possible to model the area of an environment as an oval or circular space illustrated in FIG. 3 with lines 304, positioned around a respective centre of luminaires 102a or 102b. Where there is more than one luminaire of a type considered to be the main lighting present in an environment, a mid-point between these luminaires may be assumed to be the centre-point of the relevant environment. Where controller 112 is able to be incorporated it may be possible to assume that the controller is placed on a wall, similar to the deduction that would be made where wall lighting is identified. Thus a further element of the deduced floorplan can be included, and distance information between controller 112, luminaire 104c, and luminaire 102b can be combined with this information.

It should be appreciated that the more lighting devices used within an environment the more accurate the deduced layout and possible floorplan may become. In FIG. 3 lines 306 illustrate an example of a deduced floorplan.

A type of a luminaire may be known to the connected lighting system based on a unit identity code or model number of the luminaire. Luminaires may also broadcast their capabilities or functionalities, or this information may be stored in a memory accessible by the connected lighting system or environment management system for the purposes of identifying luminaire types and likely functions of respective luminaires within a space. For example it may be possible to determine whether a particular luminaire is wall lighting, a side lamp, or ceiling lighting; whether it is dimmable, comprises florescent tubes, or is compatible with energy saving bulbs etc.

Any of the above-described spatial information can be used to determine spatial characteristics such as the size and/or dimensions of a room or zone, or the environment 100 as a whole; and in turn any characteristics derived in such a manner can be used to adapt the automatic filtering of items recommended for introduction into the environment 100. E.g. if it is determined that a room or flat is small, then only smaller items of furniture may be recommended.

Types of luminaires and any associated information may also be used to add other information to the environment profile for the purpose of assisting in the filtering. For example a luminaire may be identified by its model number, its model name, or a more descriptive product name. This model name may impart information about the stylistic qualities of the luminaire, i.e. 'modernist side lamp', or 'classic standing lamp'. Further to identifying the luminaire type, a description may be stored in association with this information which may be similarly accessible by the environment management system. This description may supply information about the stylistic qualities of the luminaire, as well as other specifications. Stylistic qualities of luminaires may then be used to deduce stylistic qualities of the environment.

The above discussed deduced layout and stylistic qualities of the environment provide information used to build a profile of said environment(s). This environment profile can be stored in database 204, or stored on a computer storage medium located remotely, in one or more distributed locations, and accessed via a suitable network connection. The remote storage may for example be a server of a computer network or computer implemented storage forming part of, or connected to, the network connection of the script compiler.

The deduced layout of an environment may be presented to user 110 as a floorplan within a user interface. This may be the same or a different user interface through which user input is received when setting up connected devices as discussed above. The user may be asked to confirm any such deductions made by the environment management system based on information available to the connected lighting system, and additionally may be presented with an opportunity to correct any errors in this information.

When using personal or user specific input devices to control (or commission) the environment management system network, data may be recorded that relates to information about the behaviour of a specific user, and with that the preferences of different users within the environment. For example, personal user preferences for certain luminaire designs, light content and configurations, daily routines and activities, consumed media content (images, audio, video, gaming), etc. may be included in the environment profiles and related to particular instances of user 110.

In addition, with linked smart systems (actively or e.g. when all systems are connected to one network) additional information about the user and his behaviour could be collected by combining data from these systems. For example these systems may be a Nest, Toon, Sonos, Apple Home, or any other smart home compatible system. In an embodiment, an example could be the use of connected lighting with a smart thermostat system, where a specific temperature set point combined with a specific light atmosphere could help to infer information about the context of those settings. Another example is a connected entertainment system which could be used in combination with a lighting system. When such an entertainment system is used with light effects more information can be provided about the environment and context. That is to say, a combination of knowing what content is being played (e.g. music, video, etc.) and what light effect setting is used to accompany it, more information can be provided compared to the two events being considered to be separate events whereby the user consumes certain content and separately switches on some light scene.

In embodiments the environment profile may be output and used to inform other parties or services (online or otherwise), of any preferences that may be determinable from the information contained within the environment profile. For example, this data source can be of great use to an online shopping platform company. For example if a person has a small home such as a studio apartment it does not make sense to show them adverts or suggestions for large sofas or appliances. Similarly if it is known via the environment profile that the user has a studio apartment, when the user is online shopping for art the advertisements shown in a search engine may show art pieces that are usually bought by consumers with a studio apartment. Further to this, it may be deduced via the environment management system (i.e. a smart home system) that the living room is large; when the user is on a furniture website looking for sofas the larger sofas that will fit within the living room of dimensions specified in the environment profile are shown first. For example when deducing a size of the 'living room', a maximum and minimum possible size of sofa 114 may be determined. Sofas of similar size to sofa 114 may then be shown first when the user is on a furniture website.

It should be understood that the items recommended by the recommendation engine may be physical items to be placed within the environment such as a sofa or table, or the item(s) may be digital items such as a particular movie, song, or light scene. These digital items may be recommended based on characteristics that include positions, types, or configuration of lights that may suit the usage requirements of the digital item. The characteristics may be derived from and indicative of the configuration of the lights in the connected lighting system particularly suiting the light effects contained with the light script of a particular movie. Further, a particular type, genre, artist for music may be recommended based on knowledge that the environment contains a particular quality of standard sound system.

In embodiments the naming of the rooms in the Hue app (e.g. living room, bathroom, games room etc.) can provide insights into how different environments or parts of environments are used, such as rooms in a house or offices in a company building. The name "Baby room" for luminaires in a room of a house is a clear indication of that particular room's function. As would be 'Games room', 'Art room', or 'Utility room' etc. This room allocation can inform a shopping platform as to how the user 110 uses their home, and subsequently what products the user may be looking to modify their environment with.

The connected lighting system can also provide information on the frequency of use of the environment. For example, all users will likely have at least one luminaire designated as 'Kitchen', but the amount of time spent there deduced from usage levels (e.g. burn hours) of the 'kitchen' luminaire(s) may indicate whether the user has a preference for baking (given a higher than average usage level—i.e. high recorded burning hours) or convenience food (given a lower than average usage level—low recorded burning hours). As such adverts for respective fast food vendors or baking good stores may be targeted towards a specific user via their person user device. Similarly, if it is known via the environment management system how much time a user spends in the kitchen, it may be subsequently determined (e.g. by a third party purchase profile service or advertising targeting service 212), that the user spends more time in the kitchen than comparable users. Thus it may be assumed that (s)he likes cooking, and subsequently when an online general store is visited the landing page may show kitchen appliances.

It may also be deduced, if there is also a presence sensor in the kitchen, that there may be more than one person present. Thus, if the burn hours are high, this area may be able to be classed as a social area of the home and such information to be included in the environment profile. This may consequently enable an online shopping recommender to suggest different items for use in modifying that zone than if the main social area of the home was the lounge. This may also result in the recommender suggesting more kitchen related products than for the lounge or any other zone of the environment.

In embodiments if a user owns luminaires of the style category 'contemporary', other products with a contemporary style can be recommended to that user. While if a user is associated with luminaires from the 'classical' or 'traditional' category, 'contemporary' products will not be recommended.

In embodiments other details of specification information about a luminaire may be used to indicate trends of use or style in an environment. For example, the type of lamp may also be an indication of profile. For example, the e27 bulb is a fairly standard light bulb, whereas the light strip (comprising LEDs) requires more creative thinking to install—thus, those who have lots of light strips may be more creative. This information may be entered into the environment profile such that more creative or artistic style items are recommended to these appropriate user. Users who buy or own a HueGo or Bloom luminaire etc. may like to rearrange their lighting more often, and so other items which are capable of having a more flexible presence in an environment may be recommended to these users (i.e. smaller, more mobile items of furniture, or items of furniture which do not have to be placed against a wall etc.).

Thus it can be seen how information already available to a connected lighting system can be gathered to inform and enhance a user's online purchasing profile, that as result could provide more meaningful and relevant advertisements and recommendations.

In embodiments any item within the environment may be enabled in such a way that it can connect to the environment management system. For example any table, chair, bookcase or other item may be provided with a means for communicating attributes of itself to the environment management system if so configured. I.e. a beacon, and/or a Wi-Fi interfaced chip, and/or an NFC tag may be attached to any item within the environment and contain specification information about the item. For example a table may be capable of communicating to the environment management system details about its physical dimensions or stylistic qualities (e.g. pattern and/or colour etc.). Such information can also be used in determining sizes of specific rooms or areas within an environment as such an item must at least currently fit within the environment, similarly such information may also be used in determining the style of said room or space within the environment.

Figure 4:
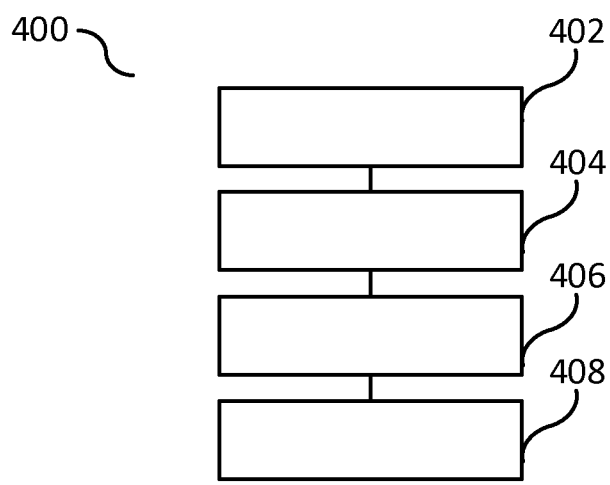
FIG. 4 shows a flow chart illustrating the steps in modifying an environment based on gathered information relating to placement of luminaires within the environment.

FIG. 4 shows a flow chart of the steps of the process 400 of deducing characteristics of each of one or more zones of the environment based on gathered information on the placement of multiple luminaires within the environment.

In step 402 information is gathered which relates to the placement of multiple luminaire in a lighting system of an environment. For example this may include the name given to a luminaire, the model number of the luminaire, etc. The process then moves on to step 404 where, based on this gathered information, characteristics of each of one or more zones in a floorplan of said environment are deduced. For example it may be that the type of zone or room can be deduced i.e. living room or bedroom. Throughout the description the word room and zone are used interchangeably to describe parts, spaces, or areas of the environment. Embodiment herein are therefore described with reference to both rooms and zones by way of example.

In step 406 an environment profile is generated comprising characteristics of each of the one or more zones of the environment. For example the characteristics may include an estimated size of the zone or room, e.g. large, small, of average size. The room size may be deduced approximately based on the number of luminaires present in the room. E.g. there are three luminaires in the 'dining room', three luminaires in the 'kitchen' and eight luminaires in the 'lounge'. Based on this information it may be deduced that the lounge is much bigger than the kitchen and the dining room. It may also be deduced, based on this same information, that the kitchen and the dining room are of a similar size. The characteristic of a zone may be further elaborated on by stipulating a range of numerical dimensions within which specific objects may fall in order for these objects to be accommodated by the zone or room.

In step 408 the generated environment profile is stored such that it can be accessed by a recommendation engine, thereby causing the recommendation engine to recommend a modification to a zone of the environment illuminated by one or more of the multiple luminaires and based on said at least one characteristic. For example based on the environment profile comprising a characteristic of a large living room a recommendation engine having access to the environment profile may recommend sofas specifically known to the recommendation engine as being suitable for large living rooms.

In embodiments updates to the environment profile may be instigated based on online purchases. For example a profile detailing particular items bought by the user 110 may be maintained. This may be based on information gathered either by an application running in the background of a user input device, or as part of the environment management system application itself. The user input device being one connected to the environment management system, either current to the user input being entered by the user or subsequent to its input. In embodiments this activity profile may be determined by a third party, where information deemed to be potentially relevant to an associated environment profile may be communicated to the respective environment management system via a suitable network connection (e.g. the Internet). Since online activity patterns often change depending on life events and stages, these activities can provide valuable information to the environment management system. In particular information on how the environment and its inhabitants are using and existing in the environment, how this may be changing, and what their likely needs may be in the near future.

In embodiments updates to the environment profile may be based on a purchasing profile for example (a similar type of profile that could also be used may be an online activity profile or recorded internet history). This purchasing profile may then be used to design, alter and suggest lighting parameters, lighting products, or lighting services, and any other environment management features. Since purchasing patterns change depending on life events and stages, these can provide valuable input to environment management systems and how the environment profile may be changed to fit these changes.

For example, if a user's purchasing profile indicates that they are expecting a baby (e.g. they have purchased or expressed interest in purchasing books on pregnancy, children's furniture, home cooking appliances etc.) then the smart home system can use this information to suggest modifications to the smart home which may assist in this life changing moment, such as recommending stumble lighting for those many night time trips to the bathroom, or nightlights for a child's room.

In embodiments the environment management system may automatically adjust lighting scenes to be used in the environment. For example, the connected lighting system may alter colour palates and scenes to those which support relaxation while offering enough light to see during night time feedings, or those which may help a mother get back to sleep. As the child grows these light scenes can adjusted back to their original settings. This may be triggered by timers informed of a particular date of purchase of particular items.

In embodiments the environment management system app may use this further information to automatically bring particular features to the user's attention at the most suitable times. For example, offering lighting games to help parents with the bedtime rituals, or to offer dimmed safety lighting to guide young children to the bathroom during night time. By incorporating user activity information such as that gained from purchasing profiles, specific user needs can be better derived and more relevant personal services or products can be offered.

Another example may be the purchasing profile associated with an elderly couple. Such a profile may indicate their age and any medical issues they may be having, such as poor eyesight. The environment management system may then automatically alter the environment profile such that the connected lighting system is caused to increase the brightness of all the luminaires by a specific amount, or adjusts a correlated colour temperature. By deducing these modifications automatically based on an environment profile the potential of the environment management system can be realized, particularly where users may not be aware of all the possibilities available to them with respects to the luminaires incorporated in their environment.

It will be appreciated that the above embodiments have been described only by way of example. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of using a lighting system comprising multiple luminaires, the method comprising:
    gathering information from the lighting system relating to a placement of a plurality of said luminaires within an environment, the gathered information comprising information about an identity of a group to which each of the plurality of luminaires belongs and a number of luminaires in each group;
    based on the gathered information, deducing one or more spatial characteristics of the environment, the spatial characteristics comprising information on one or more zones of said environment, the deducing comprising deducing the existence of the zones based on the groups;
    storing an environment profile for said environment in a storage location accessible by a recommendation engine, wherein said recommendation engine is part of an online purchasing platform and/or an online advertisement provider; the environment profile comprising at least said spatial characteristics of the one or more zones, thereby causing the recommendation engine to filter a set of items based on the spatial characteristics and thereby recommend a subset of the items resulting from the filtering for modifying said environment; wherein the recommended modification comprises an addition of at least an item to said environment; and
    deducing a type of one or more of the zones based on the identity of a corresponding one or more of the groups, wherein the gathered information further comprises a model number, a model name, and/or a unit code of at least one luminaire within each of said one or more zones of the environment such that the type of zone is deduced based on associated specification information for said luminaire.

2. The method of claim 1, wherein said gathered information comprises information about a position of each of said plurality of luminaires within the environment.

3. The method of claim 2, wherein said deduced spatial characteristics comprise one or more dimensions of at least one of the zones, deduced based on the positions of two or more of the plurality of luminaires.

4. The method of claim 3, wherein said gathered information comprises distance measurements between two or more of the luminaires within said at least one of the zones of the environment.

5. The method of claim 1, wherein said deduced spatial characteristics comprise an indication of the number of zones.

6. The method of claim 1, wherein said deduced spatial characteristics comprise an indication of a size of at least one of the zones.

7. The method of claim 1, wherein the deducing of the size is based on the number of luminaires within a corresponding one of said groups.

8. The method of claim 1, wherein the type of zone is selected from amongst a list comprising: bathroom, living room, dining room, kitchen, nursery, games room, hallway, basement, garage, utility room, attic, garden.

9. The method of claim 1, wherein the type of zone is deduced from the identity of the group to which each of the plurality of luminaires belongs.

10. The method of claim 1, wherein the identity comprises a user specified name allocated by a user to at least one luminaire within each of said groups.

11. A computer program product comprising code embodied on non-transitory computer-readable storage and configured so as when run on one or more processing units of a computing device to perform operations in accordance with claim 1.

12. An equipment comprising memory comprising one or more memory units and processing apparatus comprising one or more processing units, the memory storing code arranged to be run on the processing apparatus, and the code being configured so as when run on the processing apparatus to perform operations in accordance with claim 1.

* * * * *